(12) United States Patent
Harada et al.

(10) Patent No.: US 12,037,977 B2
(45) Date of Patent: Jul. 16, 2024

(54) VORTEX GENERATOR FOR WIND TURBINE BLADE, WIND TURBINE BLADE, AND WIND POWER GENERATING APPARATUS

(71) Applicant: MITSUBISHI HEAVY INDUSTRIES, LTD., Tokyo (JP)

(72) Inventors: Motoshi Harada, Tokyo (JP); Kai Karikomi, Tokyo (JP); Wakako Ariki, Tokyo (JP); Yasuaki Shiraishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/035,204

(22) PCT Filed: Nov. 26, 2021

(86) PCT No.: PCT/JP2021/043335
§ 371 (c)(1),
(2) Date: May 3, 2023

(87) PCT Pub. No.: WO2022/114106
PCT Pub. Date: Jun. 2, 2022

(65) Prior Publication Data
US 2023/0407837 A1 Dec. 21, 2023

(30) Foreign Application Priority Data
Nov. 27, 2020 (JP) .................. 2020-197416

(51) Int. Cl.
*F03D 1/06* (2006.01)

(52) U.S. Cl.
CPC .... *F03D 1/06495* (2023.08); *F05B 2240/303* (2020.08); *F05B 2240/3062* (2020.08)

(58) Field of Classification Search
CPC .. F03D 1/0649; F03D 1/06495; F03D 1/0633; F03D 1/0675; F05B 2240/3062
See application file for complete search history.

(56) References Cited

U.S. PATENT DOCUMENTS 11,028,826 B2 * 6/2021 Madsen .............. F03D 1/06495
2009/0016891 A1   1/2009 Parsania et al.
(Continued)

FOREIGN PATENT DOCUMENTS

CN     101344068 A    1/2009
CN     207420779 U    5/2018
(Continued)

OTHER PUBLICATIONS

PCT/ISA/210 and PCT/ISA/237, "International Search Report with Written Opinion for PCT International Application No. PCT/JP2021/043335," Jan. 25, 2022.
(Continued)

*Primary Examiner* — Sang K Kim
(74) *Attorney, Agent, or Firm* — HAUPTMAN HAM, LLP

(57) ABSTRACT

A vortex generator for wind turbine blade includes: a platform; and at least one fin disposed projecting from an upper surface of the platform, and including a leading edge and a trailing edge. A rear end surface of the at least one fin, including the trailing edge, has a shape inclined backward as a distance from a bottom surface of the platform increases in a height direction of the fin.

18 Claims, 7 Drawing Sheets

(56) References Cited

U.S. PATENT DOCUMENTS

| | | | |
|---|---|---|---|
| 2011/0142595 A1* | 6/2011 | Santiago | F03D 1/0675 416/235 |
| 2015/0010407 A1 | 1/2015 | Zamora Rodriguez et al. | |
| 2015/0204306 A1 | 7/2015 | Herr et al. | |
| 2017/0138339 A1 | 5/2017 | Fukami | |
| 2017/0138341 A1 | 5/2017 | Fukami | |
| 2017/0248116 A1* | 8/2017 | Fukami | F03D 13/10 |
| 2019/0003451 A1* | 1/2019 | Harada | F03D 1/0633 |
| 2020/0063718 A1* | 2/2020 | Ruijter | F03D 80/50 |

FOREIGN PATENT DOCUMENTS

| | | |
|---|---|---|
| DE | 102013201871 A1 | 8/2014 |
| EP | 2484898 A1 | 8/2012 |
| EP | 2824320 A1 | 1/2015 |
| EP | 2739529 B1 | 9/2015 |
| EP | 2736805 B1 | 6/2017 |
| EP | 3690230 A1 | 8/2020 |
| JP | 2017-089526 A | 5/2017 |
| JP | 2017-089561 A | 5/2017 |
| JP | 6148364 B1 | 6/2017 |
| JP | 2019-011741 A | 1/2019 |
| JP | 2020-507712 A | 3/2020 |
| JP | 2020-105998 A | 7/2020 |
| WO | 2006/122547 A1 | 11/2006 |
| WO | 2014/198353 A1 | 12/2014 |
| WO | 2015/030573 A1 | 3/2015 |

OTHER PUBLICATIONS

PCT/IB/373, "International Preliminary Report on Patentability for PCT International Application No. PCT/JP2021/043335," Jun. 8, 2023.

Japan Patent Office, "Office Action for Japanese Patent Application 2020-197416," Nov. 2, 2021.

Japan Patent Office, "Office Action for Japanese Patent Application 2020-197416," Apr. 19, 2022.

* cited by examiner

VORTEX GENERATOR FOR WIND TURBINE BLADE, WIND TURBINE BLADE, AND WIND POWER GENERATING APPARATUS

TECHNICAL FIELD

The present disclosure relates to a vortex generator for wind turbine blade, a wind turbine blade, and a wind power generating apparatus.

This application claims the priority of Japanese Patent Application No. 2020-197416 filed on Nov. 27, 2020, the content of which is incorporated herein by reference.

BACKGROUND

Conventionally, approaches to improve aerodynamic performance of a wind turbine blade have been sought with the object of improving operation efficiency of a wind turbine. In one of the approaches, a vortex generator is disposed on a surface of the wind turbine blade to suppress separation of a flow along the surface of the wind turbine blade.

Patent Documents 1 to 8 disclose a vortex generator having a base portion mounted on a surface of a wind turbine blade, and a fin disposed upright on the base portion.

CITATION LIST

Patent Literature
Patent Document 1: EP2484898A
Patent Document 2: WO2015/030573A
Patent Document 3: DE102013201871A
Patent Document 4: WO2014/198353A
Patent Document 5: EP2824320A
Patent Document 6: EP2739529A
Patent Document 7: WO2006/122547A
Patent Document 8: EP2736805A

SUMMARY

Technical Problem

Meanwhile, since a surface of a wind turbine blade is curved, the smaller a platform of a vortex generator is, the easier the vortex generator is attached to the wind turbine blade. On the other hand, as the size of the wind turbine blade increases, the size of the vortex generator also tends to increase. Therefore, it is desired to realize a vortex generator mounted with a fin as large as possible on a platform, without excessively increasing the size of the platform.

In view of the above, an object of at least one embodiment of the present invention is to provide a vortex generator for wind turbine blade, a wind turbine blade, and a wind power generating apparatus capable of mounting an enlarged fin while suppressing an increase in platform size.

Solution to Problem

A vortex generator for wind turbine blade according to at least one embodiment of the present invention, includes: a platform; and at least one fin disposed projecting from an upper surface of the platform, and including a leading edge and a trailing edge. A rear end surface of the at least one fin, including the trailing edge, has a shape inclined backward as a distance from a bottom surface of the platform increases in a height direction of the fin.

A wind turbine blade according to at least one embodiment of the present invention, includes: a blade body; and the above-described vortex generator attached to a surface of the blade body.

A wind power generating apparatus according to at least one embodiment of the present invention, includes: a wind turbine rotor including the above-described wind turbine blade; and a generator configured to be driven by the wind turbine rotor.

Advantageous Effects

According to at least one embodiment of the present invention, provided are a vortex generator for wind turbine blade, a wind turbine blade, and a wind power generating apparatus capable of mounting an enlarged fin while suppressing an increase in platform size.

DETAILED DESCRIPTION

Figure 1:
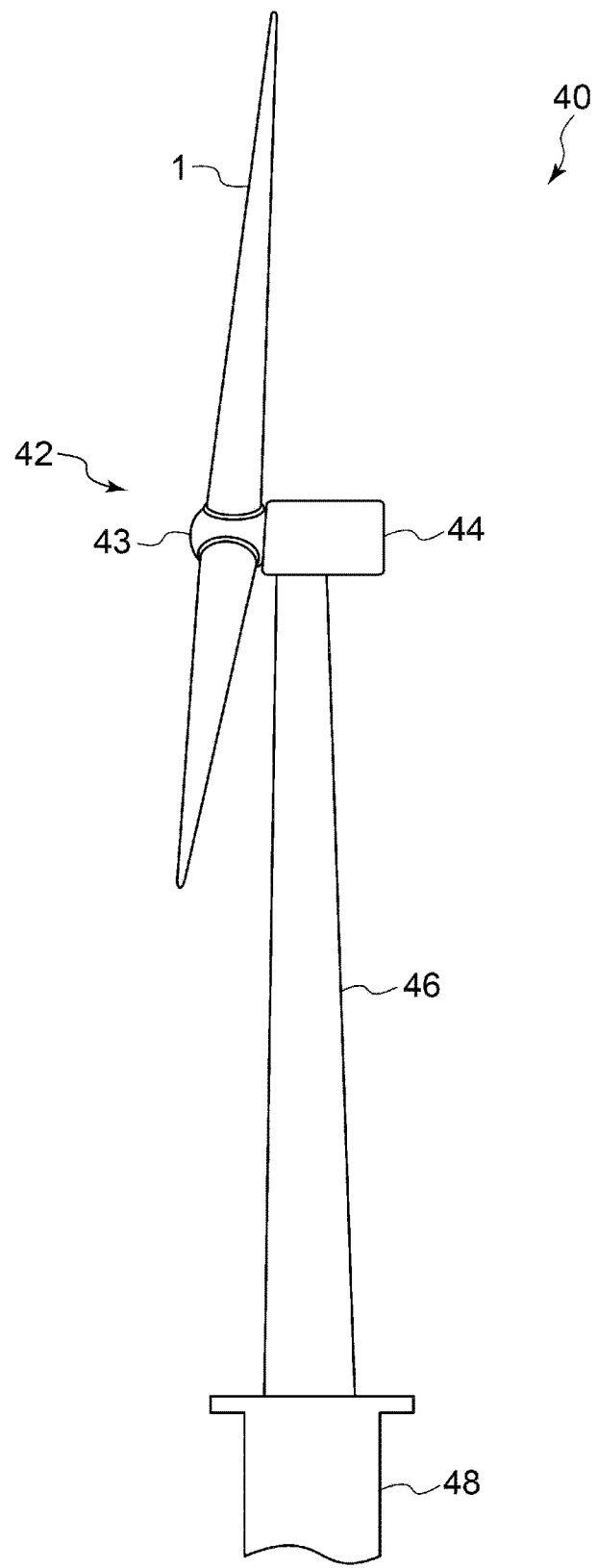
FIG. 1 is a schematic configuration view of a wind power generating apparatus according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

(Configuration of Wind Power Generating Apparatus)

First, with reference to FIGS. 1 and 2, the overall configuration of a wind power generating apparatus and a wind turbine blade to which a vortex generator is applied according to some embodiments will be described. FIG. 1 is a schematic configuration view of the wind power generating apparatus according to an embodiment, and FIG. 2 is a perspective view of the wind turbine blade according to an embodiment.

As shown in FIG. 1, a wind power generating apparatus 40 includes a rotor 42 composed of at least one (for example, three) wind turbine blade 1 and a hub 43. It is configured such that the wind turbine blade 1 is radially mounted on the hub 43, the rotor 42 is rotated by receiving wind with the wind turbine blade 1, and electricity is generated by a generator (not shown) connected to the rotor 42. In the embodiment shown in FIG. 1, the rotor 42 is supported by a nacelle 44 disposed on an upper side of a tower 46. Further, the tower 46 is disposed upright on a base structure 48 (a foundation structure, a floating structure, or the like) disposed on water or on land.

(Configuration of Wind Turbine Blade)

Figure 2:
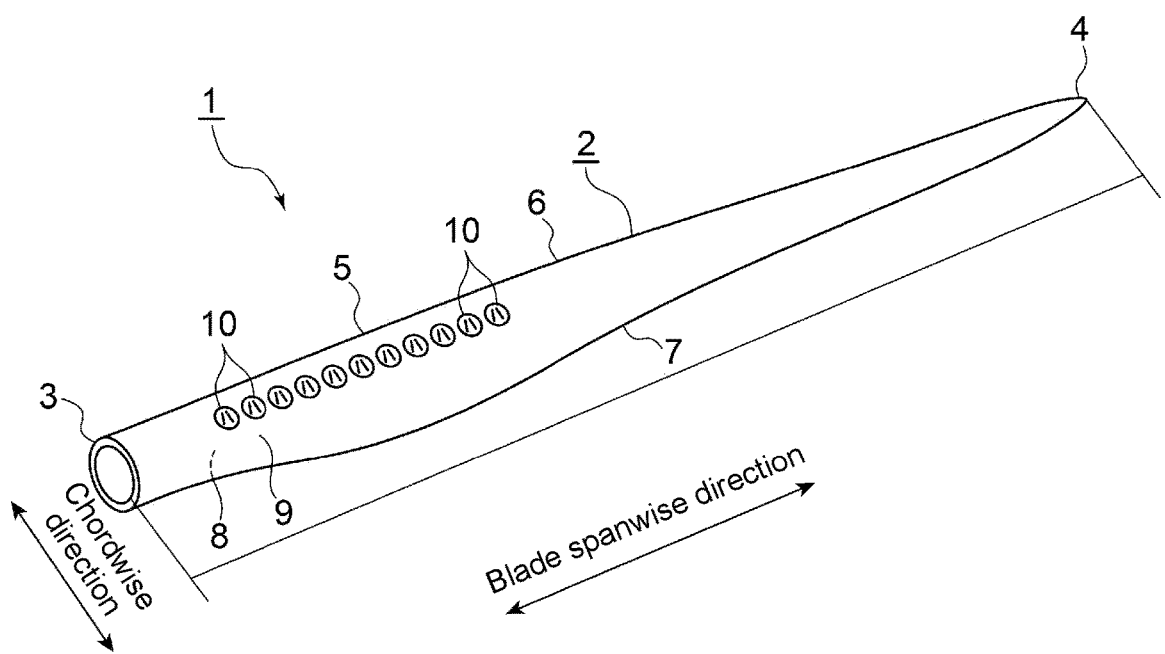
FIG. 2 is a perspective view of a wind turbine blade according to an embodiment.

As shown in FIG. 2, the wind turbine blade 1 includes a blade body 2, and vortex generators 10 disposed on the surface of the blade body 2 (blade surface).

The blade body 2 includes a blade root 3 mounted on the hub 43 of the wind power generating apparatus 40, a blade tip 4 located farthest from the hub 43, and an airfoil portion 5 extending between the blade root 3 and the blade tip 4. Further, the wind turbine blade 1 has a leading edge 6 and a trailing edge 7 from the blade root 3 to the blade tip 4. Furthermore, an exterior shape of the wind turbine blade 1 is formed by a pressure surface (concave surface) 8 and a suction surface (convex surface) 9 disposed opposite to the pressure surface 8.

In the wind turbine blade 1 shown in FIG. 2, the plurality of the vortex generators are attached to the suction surface 9 of the blade body 2. The plurality of vortex generators are arranged on the suction surface 9 of the blade body 2 and along a blade spanwise direction. Hereinafter, in the present specification, the "blade spanwise direction" refers to a direction connecting the blade root 3 and the blade tip 4.

(Configuration of Vortex Generator)

Next, the vortex generator 10 according to some embodiments will be described in detail with reference to FIGS. 3 to 8.

Figure 3:
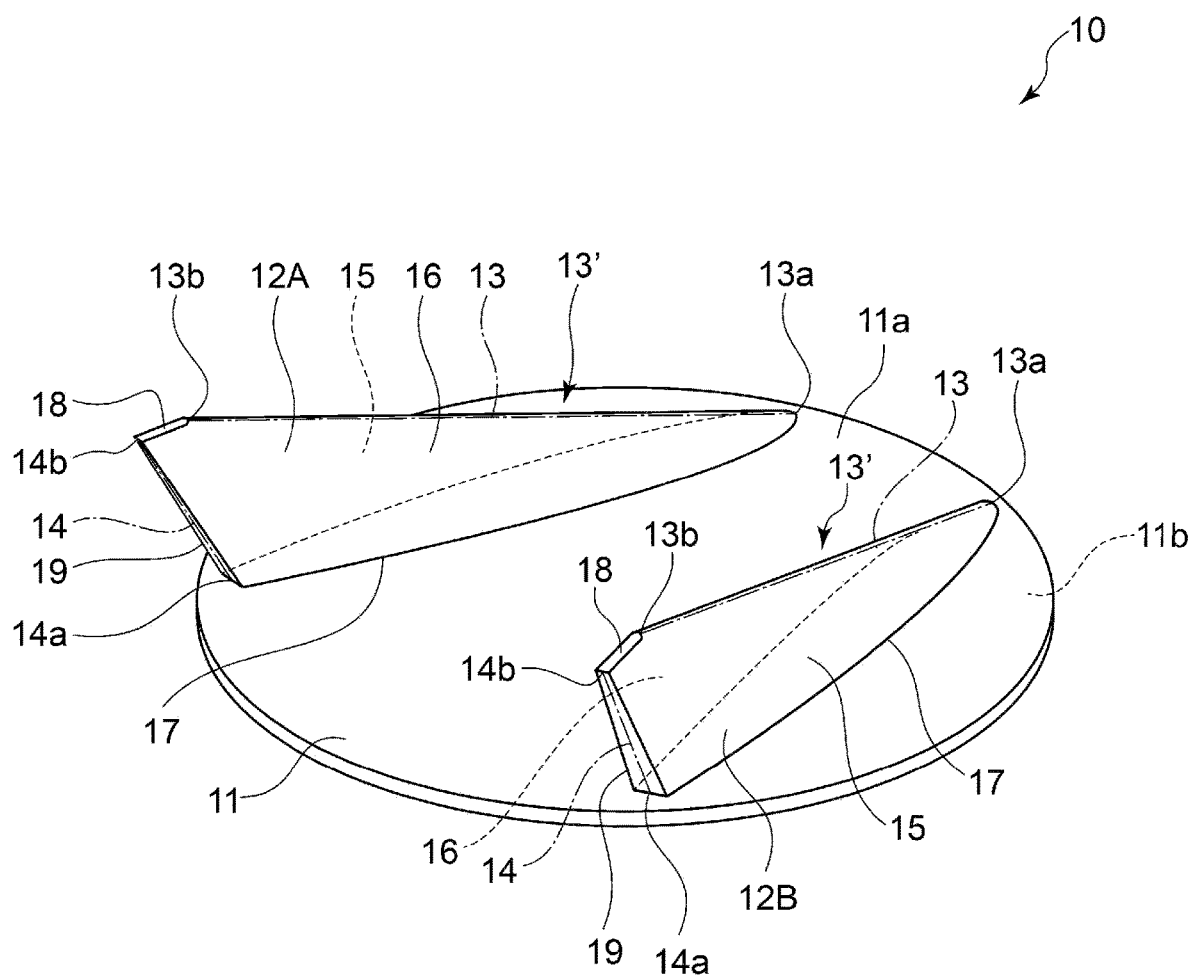
FIG. 3 is a perspective view of a vortex generator according to an embodiment.
Figure 4:
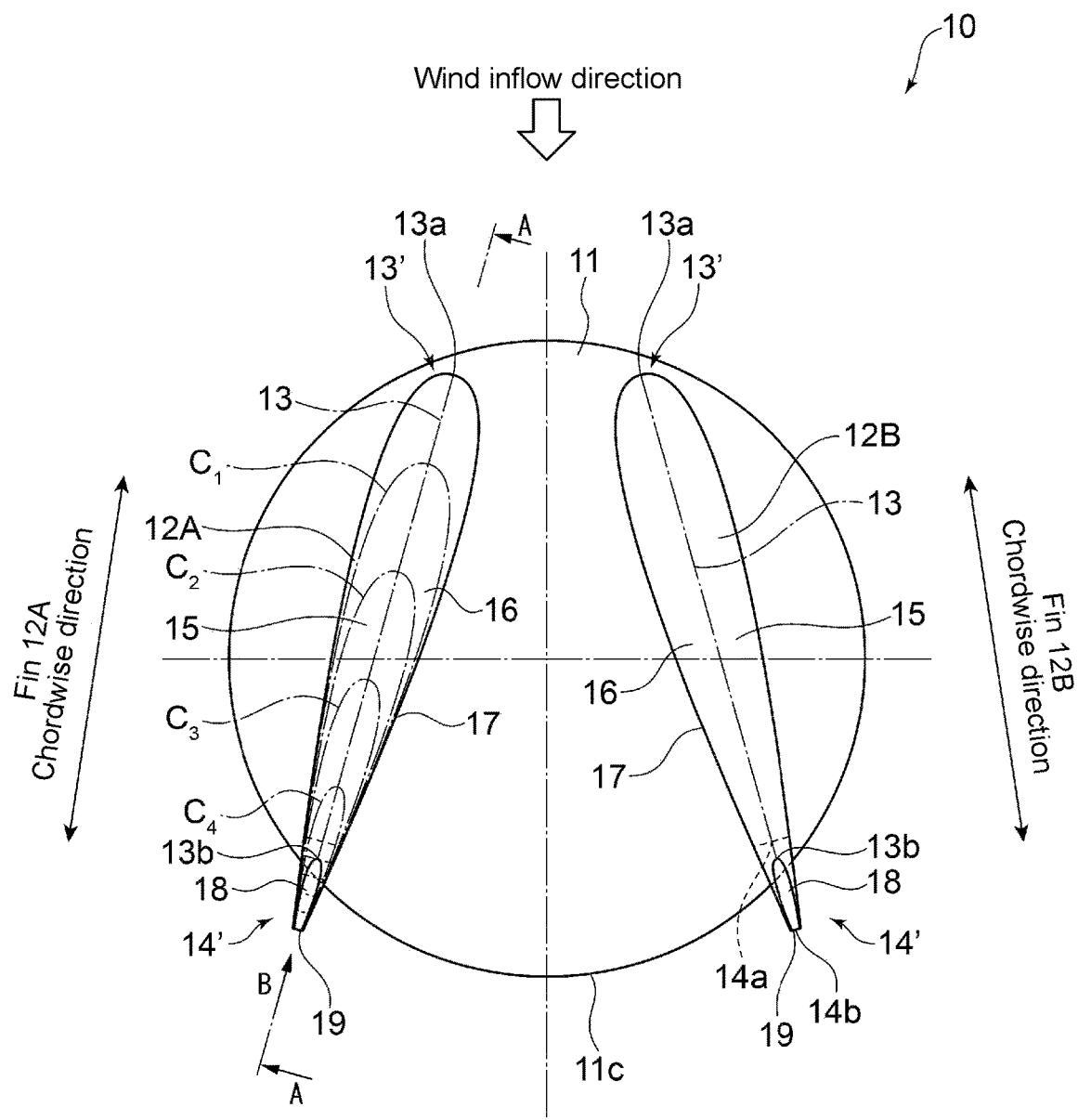
FIG. 4 is a plan view of the vortex generator shown in FIG. 3.
Figure 5:
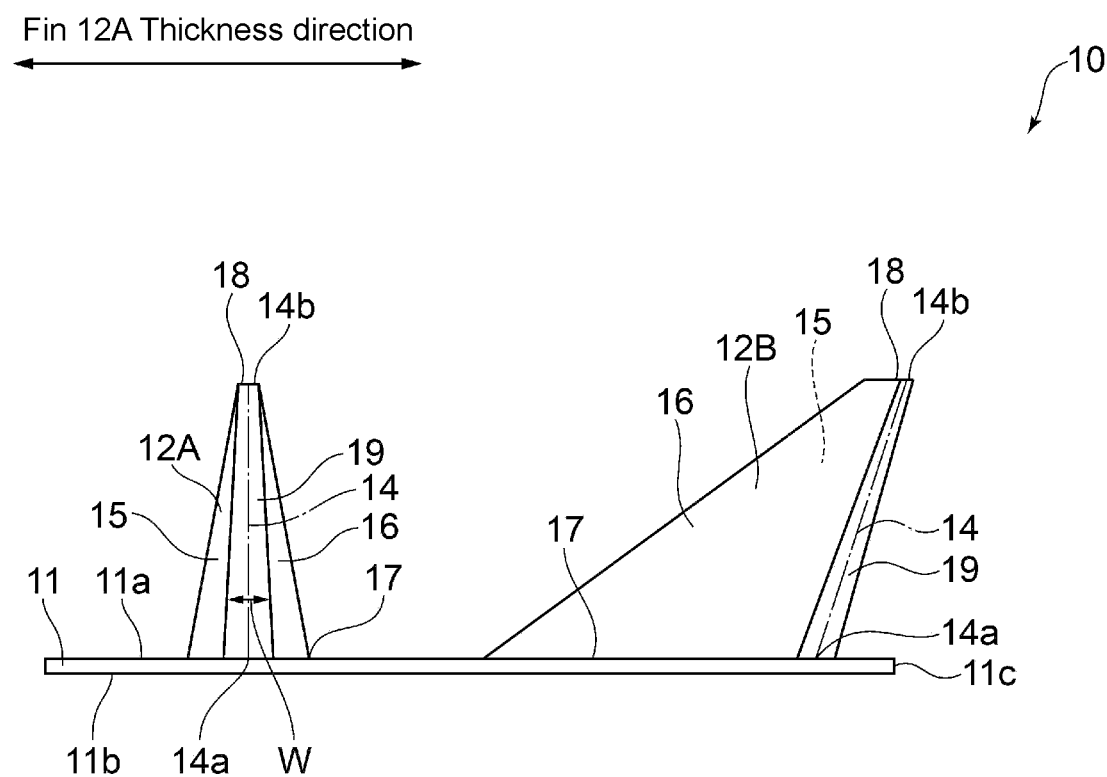
FIG. 5 is a view of the vortex generator shown in FIG. 4 as viewed from the direction of an arrow B.
Figure 6:
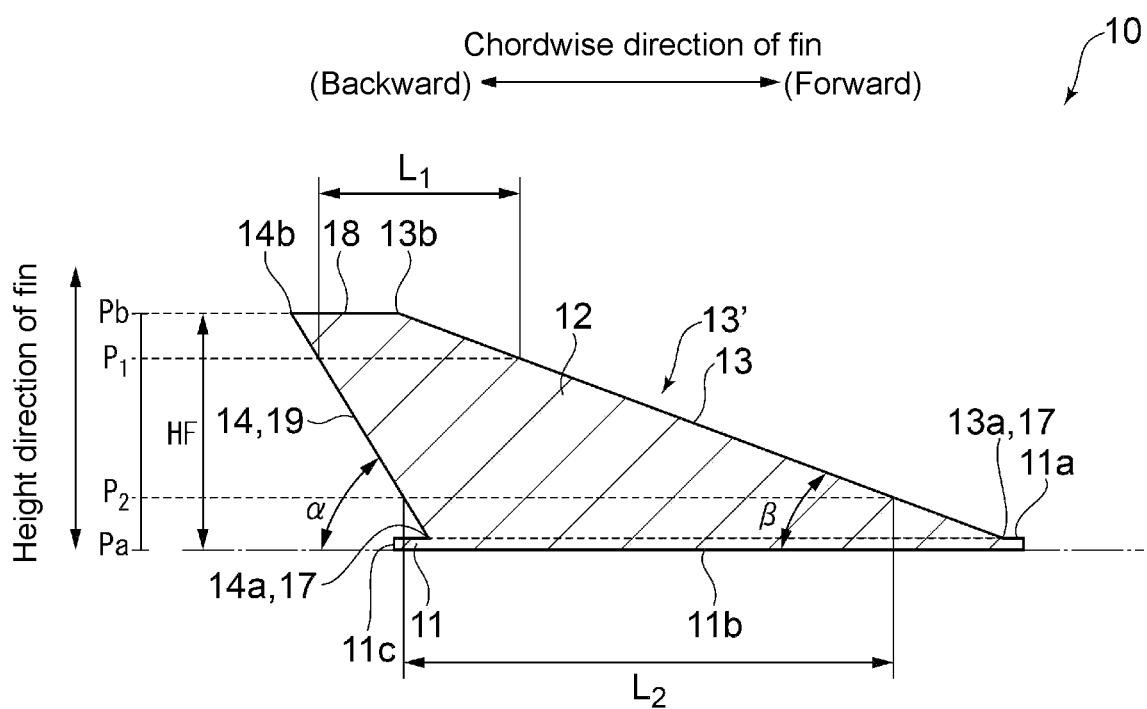
FIG. 6 is a view showing a cross section taken along line A-A in FIG. 4.
Figure 7:
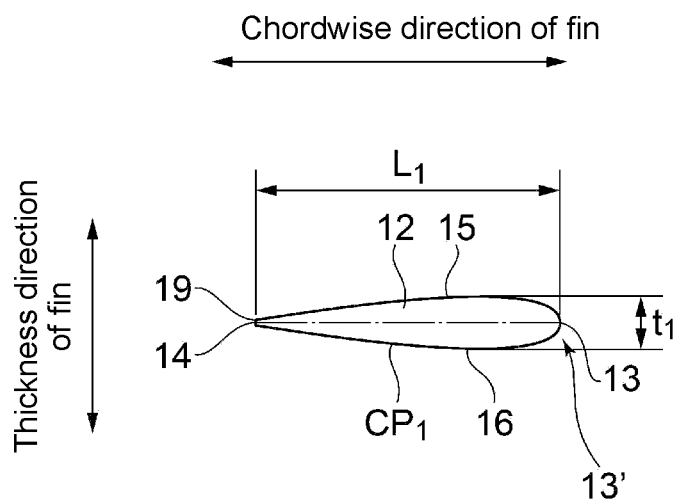
FIG. 7 is a view showing a cross section orthogonal to a blade height direction of the vortex generator shown in FIG. 4.
Figure 8:
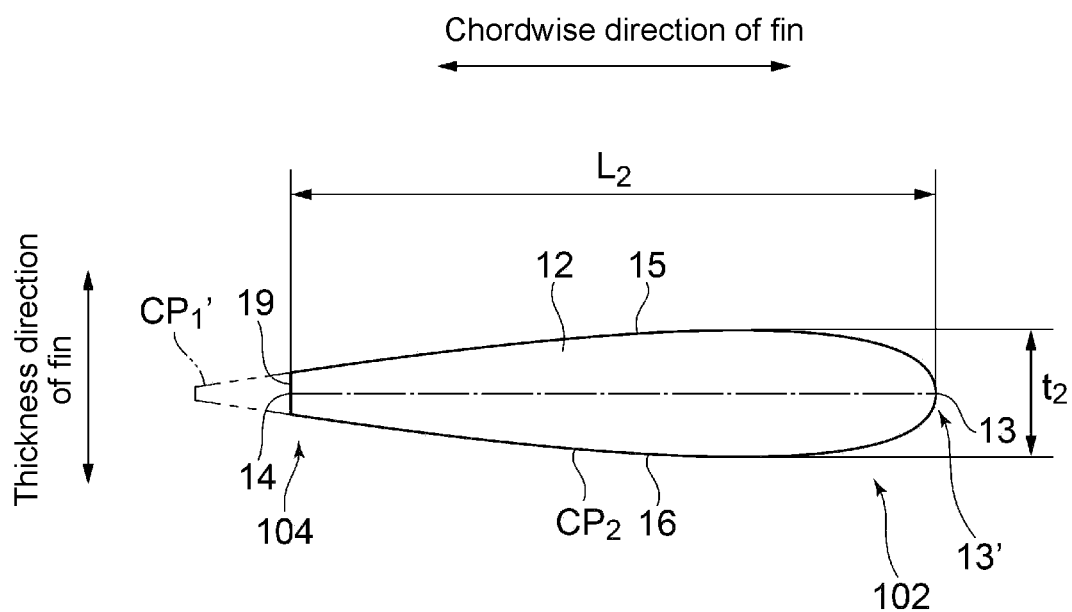
FIG. 8 is a view showing a cross section orthogonal to the blade height direction of the vortex generator shown in FIG. 4.

FIG. 3 is a perspective view of the vortex generator according to an embodiment, and FIG. 4 is a plan view (a view as viewed from a fin height direction) of the vortex generator shown in FIG. 3. FIG. 5 is a view of the vortex generator shown in FIG. 4 as viewed from the direction of an arrow B. FIG. 6 is a view showing a cross section taken along line A-A in FIG. 4 (a cross section including a chord and the height direction of the fin). FIGS. 7 and 8 are each a view showing a cross section orthogonal to a blade height direction of the vortex generator shown in FIG. 4.

As shown in FIGS. 3 to 6, the vortex generator 10 includes a platform 11 mounted on a surface of the wind turbine blade 1 (more specifically, a surface of the blade body 2), and at least one fin 12 disposed on the platform 11.

The platform 11 has an upper surface 11a where the fin 12 is disposed, and a bottom surface 11b opposite to the upper surface 11a. The vortex generator 10 is attached to the surface (for example, the suction surface 9) of the blade body 2 via the bottom surface 11b. As shown in FIGS. 3 and 4, the platform 11 may have a circular shape as viewed from the height direction of the fin 12. Alternatively, the platform 11 may have a shape other than a circle, such as an ellipse, a polygon, or the like as viewed from the height direction.

The at least one fin 12 is disposed projecting from the upper surface 11a of the platform 11. In the illustrated embodiment, two fins 12A, 12B are disposed on the platform 11. Hereinafter, the fins 12A, 12B are collectively referred to as the fin 12. The fin 12 is disposed to be inclined at a predetermined angle with respect to the wind inflow direction.

As shown in FIGS. 3 to 6, the fin 12 has a leading edge 13 located upstream in a wind inflow direction, a trailing edge 14 located downstream in the wind inflow direction, a pressure surface (concave surface) 15 of the fin 12 facing upstream in the wind inflow direction, and a suction surface (convex surface) 16 of the fin 12 facing downstream in the wind inflow direction. In the fin 12, a direction of straight lines each connecting the leading edge 13 and the trailing edge 14 is a chordwise direction of the fin 12. Further, the fin 12 extends between a top portion 18 and a base portion 17 connected to the platform 11, in a height direction of the fin 12. The height direction of the fin 12 in the present specification is equal to a direction orthogonal to the bottom surface 11b of the platform 11.

C1 to C4 in FIG. 4 are each a contour of the fin 12 in the cross section orthogonal to the height direction of the fin 12, and a distance from the bottom surface 11b of the platform 11 increases from C1 toward C4.

Herein, the effect of the vortex generator 10 will briefly be described.

Separation of a flow on the suction surface 9 of the wind turbine blade 1 is caused by gradually thickening a boundary layer from a streamline flow region in the vicinity of the leading edge 6 toward a turbulent flow region downstream thereof, and separating the flow before arriving at the trailing edge 7. The vortex generator 10 attached to the wind turbine blade 1 generates a longitudinal vortex on the suction surface 16 side of the fin 12 with a lift produced by the fin 12. Further, a flow flowing into the fin 12 forms a longitudinal vortex along an edge extending from a most upstream position (the leading edge 13a in the base portion) toward a top portion (the leading edge 13b in the top portion) of the leading edge 13 of the fin 12. The longitudinal vortex thus generated by the fin 12 promotes momentum exchange in the height direction of the fin 12 between the inside and the outside of the boundary layer on the wind turbine blade 1 surface, on a wake side of the vortex generator 10. Thus, the boundary phase on the surface of the wind turbine blade 1 becomes thin, suppressing the separation of the flow from the wind turbine blade 1 surface.

In some embodiments, as shown in FIGS. 3 to 6, a rear end surface 19 of the at least one fin 12, including the trailing edge 14, has a shape inclined backward (that is, in a direction from the leading edge 13 toward the trailing edge 14 in the chordwise direction of the fin 12) as a distance from the bottom surface 11b of the platform 11 increases in the height direction of the fin 12. The rear end surface 19 may include a flat surface including the trailing edge 14.

According to the above-described embodiments, the rear end surface 19 of the fin 12 has the shape inclined backward as the distance from the bottom surface 11b of the platform 11 increases in the height direction of the fin 12. Therefore, by shifting the position of the trailing edge 14b in the top portion 18 of the fin 12, where contribution to aerodynamic performance of the wind turbine blade 1 is large, backward with respect to the position of the trailing edge 14a in the base portion 17 of the fin 12 where the contribution to the aerodynamic performance is relatively small, a sufficient chord length of the fin 12 in the top portion 18 is secured easily. Thus, the size of the platform 11 can be made relatively small relative to the fin 12, while maintaining the aerodynamic performance of the vortex generator 10. Therefore, it is possible to obtain the vortex generator 10 mounted with the larger fin 12 while suppressing the increase in size of the platform 11.

In some embodiments, in the cross section including the chord and the height direction of the fin 12, an inclination angle α (see FIG. 6) of the rear end surface 19 with respect to the bottom surface 11b of the platform 11 is not less than 55 degrees and not greater than 65 degrees. The inclination angle α is an angle formed by a straight line, which connects the position of the trailing edge 14a in the base portion 17 of the fin 12 and the position of the trailing edge 14b in the top portion 18 of the fin 12, and a straight line including the bottom surface 11b of the platform 11, in the above-described cross section.

According to the above-described embodiments, since the above-described inclination angle α is not greater than 65 degrees, the trailing edge portion of the fin 12 has a shape inclined backward. Therefore, the position of the trailing edge 14b in the top portion 18 of the fin 12 can be shifted backward by a relatively large amount with respect to the position of the trailing edge 14a in the base portion 17 of the fin 12. Thus, it becomes easy to secure a sufficient chord length of the fin 12 in the top portion 18. Further, since the above-described inclination angle α is not less than 55 degrees, the trailing edge portion of the fin 12 has a shape which is not excessively inclined backward. Therefore, it is possible to obtain the vortex generator 10 provided with the fin 12 having an appropriate size, while inclining the trailing edge portion of the fin 12. Thus, it is possible to relatively reduce the size of the platform 11, while maintaining the aerodynamic performance of the vortex generator 10.

In some embodiments, for example, as shown in FIG. 6, in at least a part of a region in the height direction of the fin 12, the leading edge 13 of the fin 12 is inclined backward as the distance from the bottom surface 11b of the platform 11 increases in the height direction. In some embodiments, in the cross section including the chord and the height direction of the fin 12, the inclination angle α (see FIG. 6) of the rear end surface 19 with respect to the bottom surface 11b of the platform 11 is greater than an inclination angle β of the leading edge 13 with respect to the bottom surface 11b of the platform 11. Herein, the inclination angle β is an angle formed by a straight line, which connects the position of the leading edge 13a in the base portion 17 of the fin 12 and the position of the leading edge 13b in the top portion 18 of the fin 12, and the straight line including the bottom surface 11b of the platform 11, in the above-described cross section.

According to the above-described embodiments, the cross-sectional area of the fin 12 in the region on the top portion 18 side of the fin 12 is easily reduced, thereby easily improving the aerodynamic performance. Thus, it is possible to relatively reduce the size of the platform 11, while maintaining the aerodynamic performance of the vortex generator 10.

In some embodiments, in the cross section including the chord and the height direction of the fin 12, the inclination angle β of the leading edge with respect to the bottom surface of the platform 11 is not less than 10 degrees and not greater than 20 degrees.

According to the above-described embodiments, since the above-described inclination angle β is not less than 10 degrees, it is easy to obtain the fin 12 having the appropriate size, while inclining a leading edge portion 13' of the fin 12. Further, since the above-described inclination angle β is not greater than 20 degrees, it is easy to ensure the aerodynamic performance of the vortex generator 10. Thus, it is possible to relatively reduce the size of the platform 11, while maintaining the aerodynamic performance of the vortex generator 10.

In some embodiments, the leading edge 13 of the fin 12 is inclined backward to a maximum height position of the fin 12 (that is, the position of the top portion 18 of the fin 12) as the distance from the bottom surface 11b of the platform 11 increases in the height direction.

According to the above-described embodiments, since the leading edge 13 is inclined backward to the maximum height position of the fin 12 as the distance from the bottom surface 11b of the platform 11 increases in the height direction of the fin 12, it is easy to ensure the aerodynamic performance of the vortex generator 10. Thus, it is possible to relatively reduce the size of the platform 11, while maintaining the aerodynamic performance of the vortex generator 10.

FIG. 7 is a view showing a cross section orthogonal to the height direction of the fin 12, at a first position P1 (see FIG. 6) in the height direction of the fin 12, and FIG. 8 is a view showing a cross section orthogonal to the height direction of the fin 12, at a second position P2 (see FIG. 6) where the distance from the bottom surface 11b of the platform 11 is smaller than at the first position P1. In FIG. 6, Pa indicates a position of the bottom surface 11b of the platform 11 in the height direction of the fin 12, and Pb indicates a position of the top portion 18 of the fin 12 in the height direction of the fin 12. Further, in FIGS. 6 to 8, $L_1$ is a chord length of a first airfoil shape $CP_1$, and $L_2$ is a chord length of a second airfoil shape $CP_2$.

In some embodiments, for example, as shown in FIGS. 6 to 8, the fin 12 has the first airfoil shape $CP_1$ at the first position P1 (see FIG. 6) in the height direction, and has the second airfoil shape $CP_2$ at the second position P2 (see FIG. 6) in the height direction, the second airfoil shape $CP_2$ including a leading edge region 102 which coincides with a similar figure $CP_{1'}$ of the first airfoil shape $CP_1$ larger in size than the first airfoil shape $CP_1$, and a trailing edge region 104 with a shape from which a part of the similar figure $CP_{1'}$ is missing. However, in FIG. 8, in the leading edge region 102 of the fin 12, the similar figure $CP_{1'}$ (dashed line) of the first airfoil shape $CP_1$ and the second airfoil shape $CP_2$ (solid line) overlap each other. That is, in FIG. 8, the chord length $L_2$ of the second airfoil shape $CP_2$ is shorter than a chord length $L_{1'}$ of the similar figure $CP_{1'}$ of the first airfoil shape $CP_1$.

According to the above-described embodiments, since the second airfoil shape $CP_2$ at the second position P2 on the base portion 17 side of the fin 12 has the shape, from which a part of the similar figure $CP_{1'}$ of the first airfoil shape larger in size than the first airfoil shape $CP_1$ at the first position P1 on the top portion 18 side is missing, in the trailing edge region 104, while basically having the shape of the similar figure $CP_{1'}$, it is possible to mount the relatively large fin 12 on the platform 11. Further, since the fin 12 has at the first position P1 on the top portion 18 side the first airfoil shape $CP_1$ with a shape, from which the trailing edge portion is not missing, compared to the second airfoil shape $CP_2$, the chord length of the fin 12 is easily secured in the region on the top portion 18 side of the fin 12 where the contribution to the aerodynamic performance is large. Thus, it is possible to relatively reduce the size of the platform 11, while maintaining the aerodynamic performance of the vortex generator 10.

In some embodiments, for example, as shown in FIGS. 7 and 8, in the fin 12, a first blade thickness ratio $t_1/L_1$ at the first position P1 in the height direction may be less than a second blade thickness ratio $t_2/L_2$ at the second position P2 where the distance from the bottom surface 11b of the platform 11 is smaller than at the first position P1 in the height direction. Note that $t_1$ is a maximum value of the blade thickness (maximum blade thickness) of the first airfoil shape $CP_1$, and $t_2$ is a maximum value of the blade thickness (maximum blade thickness) of the second airfoil shape $CP_2$. The blade thickness is the size (thickness) of each airfoil shape in the direction orthogonal to the chordwise direction (that is, the thickness direction of the fin 12).

For example, in the examples shown in FIGS. 7 and 8, since the fin 12 has at the second position P2 the second airfoil shape $CP_2$ including the trailing edge region 104 with the shape from which a part of the similar figure $CP_{1'}$ of the first airfoil shape $CP_1$ is missing, the chord length $L_2$ at the second position P2 is shorter than the chord length $L_{1'}$ of the similar figure $CP_{1'}$ of the first airfoil shape $CP_1$. Thus, the first blade thickness ratio $t_1/L_1$ $(=t_2/L_{1'})$ at the first position P1 is less than the second blade thickness ratio $t_2/L_2$ at the second position P2.

According to the above-described embodiments, since the fin 12 has the shape, in which the chord length $L_2$ relative to the maximum blade thickness $t_2$ is relatively short, at the second position P2 on the base portion 17 side, the relatively large fin 12 can be mounted on the platform 11. Further, since the fin 12 has the shape, in which the chord length $L_1$ relative to the maximum blade thickness $t_1$ is relatively long, at the first position P1 on the top portion 18 side, the aerodynamic performance of the vortex generator 10 is maintained easily. Thus, it is possible to relatively reduce the size of the platform 11, while maintaining the aerodynamic performance of the vortex generator 10.

In some embodiments, for example, as shown in FIG. 4, as viewed from the height direction of the fin 12, a rear end portion 14' including the trailing edge 14 of the fin 12 projects outward from an outer edge 11c of the platform 11. That is, as viewed from the height direction, the position of the trailing edge 14b in the top portion 18 of the fin 12 may be positioned outside the outer edge 11c of the platform 11.

According to the above-described embodiments, since the rear end portion 14' of the fin 12 projects outward from the outer edge 11c of the platform 11, the chord length of the fin 12 in the top portion 18 is secured easily. Thus, it is possible to easily reduce the size of the platform 11, while maintaining the aerodynamic performance of the vortex generator 10.

In some embodiments, the rear end portion 14' of the fin 12 may not project from the outer edge of the platform 11. That is, as viewed from the height direction, the rear end portion 14' of the fin 12 may fit inside the outer edge 11c of the platform 11. Alternatively, as viewed from the height direction, the position of the trailing edge 14b in the top portion 18 of the fin 12 may be positioned inside the outer edge 11c of the platform 11.

In some embodiments, for example, as shown in FIG. 5, a width W of the rear end surface 19 of the fin 12 decreases as the distance from the bottom surface 11b of the platform 11 increases in the height direction. The width W of the rear end surface 19 is a width of the rear end surface 19 in the thickness direction of the fin 12 (the direction orthogonal to the chordwise direction of the fin 12). In the exemplary embodiment shown in FIG. 5, the rear end surface 19 of the fin 12 has a trapezoidal shape, but may have a triangular shape in another embodiment.

According to the above-described embodiments, the width W of the rear end surface 19 of the fin 12 decreases as the distance from the bottom surface 11b of the platform 11 increases in the height direction of the fin 12. Thus, since the width W of the rear end surface 19 is relatively large in the base portion of the fin 12 where the contribution to the aerodynamic performance is relatively small, it is possible to mount the relatively large fin 12 on the platform 11. Further, since the width W of the rear end surface 19 in the base portion of the fin 12 is secured, the fin 12 is supported easily. Furthermore, since the width W of the rear end surface 19 is relatively narrow in the top portion 18 of the fin 12 where the contribution to the aerodynamic performance is large, the chord length of the fin 12 in the top portion 18 is secured easily. Thus, it is possible to relatively reduce the size of the platform 11, while maintaining the aerodynamic performance of the vortex generator 10.

In some embodiments, for example, as shown in FIG. 4, the fin 12 includes the leading edge portion 13' having the curved contour in the cross section orthogonal to the height direction of the fin 12. In FIG. 4, as the contours C1 to C4 of the fin 12 in the cross section orthogonal to the height direction of the fin 12, the leading edge portion 13' has the curved contours.

According to the above-described embodiments, since the fin 12 includes the leading edge portion 13' having the curved contour in the cross section orthogonal to the height direction of the fin 12, when the vortex generator 10 is installed on the wind turbine blade 1, a resistance to the flow of air flowing into the vortex generator 10 is reduced easily. Therefore, the aerodynamic performance of the vortex generator 10 is improved.

Further, in some embodiments, for example, as shown in FIG. 4, the fin 12 has the shape symmetrical about the chord of the fin 12. In FIG. 4, as to the contours C1 to C4 of the fin 12 in the cross section orthogonal to the height direction of the fin 12, the leading edge portion 13' has the curved contours. Further, in FIG. 4, the contours C1 to C4 each have the shape symmetrical about the chord of the fin 12. In FIG. 4, the contours C1 to C4 each have the shape symmetrical about the chord of the fin 12.

In the above-described embodiments, since the fin 12 has the shape symmetrical about the chord of the fin 12, the vortex generator 10 is molded easily compared with the case where the fin 12 has a shape asymmetrical about the chord. For example, molding by injection molding or the like is facilitated.

In some embodiments, the fin 12 may have the shape asymmetrical about the chord of the fin 12.

In some embodiments, the blade thickness ratio (maximum blade thickness/chord length) of the fin 12 may be at least 10% and at most 20%. In an embodiment, in a region of at least 30% in the height direction of the fin 12, the blade thickness ratio of the fin 12 may be at least 10% and at most 20%. In an embodiment, in an entire region in the height direction of the fin 12, the blade thickness ratio of the fin 12 may be at least 10% and at most 20%.

According to the above-described embodiments, since the blade thickness ratio of the fin 12 is at least 10% and at most 20%, the vortex generator 10 tends to have good aerodynamic performance.

In some embodiments, the vortex generator 10 (the platform 11 and the fin 12) may be made of a resin. The resin used as the material of the vortex generator 10 may be a thermoplastic such as ASA (Acrylate Styrene Acrylonitrile), AES (Acrylonitrile-Ethylene-Styrene), or the like.

According to the above-described embodiments, since the platform 11 and the fin 12 are made of the platform 11 and the fin 12 are made of a resin, molding is relatively easily.

When a vortex generator having a general shape is formed by injection molding, the vortex generator can be molded with a pair of upper and lower halves of a mold (that is, a mold halved in the height direction of the fin). However, in the vortex generator 10 according to the above-described embodiments, since the rear end surface 19 of the fin 12 has the shape inclined backward as the distance from the bottom surface 11b of the platform 11 increases in the height direction of the fin 12, it is difficult to form the vortex generator 10 only with the pair of upper and lower halves of the mold.

Therefore, when the vortex generator 10 according to the above-described embodiments is formed by injection molding, in addition to the pair of upper and lower molds, a mold is used which corresponds to the trailing edge portion (the portion including the rear end surface 19 inclined backward) of each fin 12. For the pair of upper and lower molds, the molded product is released in the vertical direction, whereas for the mold corresponding to the trailing edge portion of each fin 12, the molded product is released in the longitudinal direction of the fin 12 (the chordwise direction of the fin 12). In this manner, the vortex generator 10 according to the above-described embodiments can be molded by injection molding.

In some embodiments, a mounting angle (chordwise direction) of the fin 12 (the fin 12A and/or the fin 12B) is not less than 12 degrees and not greater than 18 degrees with respect to the wind inflow direction. By attaching the vortex generator 10 having such fin 12 to the wind turbine blade 1, it is possible to effectively suppress the separation of the flow from the wind turbine blade 1 surface.

In some embodiments, for example, as shown in FIGS. 3 to 5, each of the fins 12A, 12B may be disposed such that a distance between the pair of fins 12A, 12B widens from upstream toward downstream in the wind inflow direction (that is, from the leading edge 6 side toward the trailing edge 7 side of the wind turbine blade 1 (see FIG. 2)).

When the plurality of fins are arranged along the blade spanwise direction of the wind turbine blade, from the viewpoint of aerodynamic performance, it is considered that the plurality of fins are disposed such that a distance between adjacent pressure surfaces is longer than a distance between adjacent suction surfaces. In this regard, in the above-described embodiments, since the fin 12A and the fin 12B are disposed on the platform 11 such that the suction surface 16 of the fin 12A and the suction surface 16 of the fin 12B face each other, the distance between the fin 12A and the fin 12B can relatively be short. Thus, it becomes easier to reduce the size of the platform 11.

In some embodiments, for example, as shown in FIG. 4, the platform 11 is configured to have a circular shape as viewed from the height direction of the fin 12.

According to the above-described embodiments, since the platform 11 has the circular shape as viewed from the height direction of the fin 12, the platform 11 is easily and stably adhered to the surface of the wind turbine blade 1. Thus, it is possible to suppress separation of the vortex generator 10 from the wind turbine blade 1.

The contents described in the above embodiments would be understood as follows, for instance.

(1) A vortex generator (10) for wind turbine blade (1) according to at least one embodiment of the present invention, includes: a platform (11); and at least one fin (12) disposed projecting from an upper surface (11a) of the platform, and including a leading edge (13) and a trailing edge (14). A rear end surface (19) of the at least one fin, including the trailing edge, has a shape inclined backward as a distance from a bottom surface (11b) of the platform increases in a height direction of the fin.

With the above configuration (1), the rear end surface of the at least one fin has the shape inclined backward as the distance from the bottom surface of the platform increases in the height direction of the fin. Therefore, by shifting the position of the trailing edge in the top portion of the fin, where contribution to aerodynamic performance of the wind turbine blade is large, backward with respect to the position of the trailing edge in the base portion of the fin where the contribution to the aerodynamic performance is relatively small, a sufficient chord length of the fin in the top portion is secured easily. Thus, the size of the platform can be made relatively small relative to the fin, while maintaining the aerodynamic performance of the vortex generator. Therefore, it is possible to obtain the vortex generator mounted with the larger fin while suppressing the increase in size of the platform.

(2) In some embodiments, in the above configuration (1), the fin has a first airfoil shape ($CP_1$) at a first position (P1) in the height direction, and has a second airfoil shape ($CP_2$) at a second position (P2) where the distance from the bottom surface of the platform is smaller than at the first position in the height direction, the second airfoil shape including a leading edge region (102) which coincides with a similar figure ($CP_{1'}$) of the first airfoil shape larger in size than the first airfoil shape, and a trailing edge region (104) with a shape from which a part of the similar figure is missing.

With the above configuration (2), the fin has the first airfoil shape at the first position in the height direction, and has the second airfoil shape at the second position where the distance from the bottom surface of the platform is smaller than at the first position, the second airfoil shape including the leading edge region which coincides with the similar figure of the first airfoil shape larger in size than the first airfoil shape, and the trailing edge region with the shape from which a part of the similar figure is missing. That is, since the second airfoil shape at the second position on the base portion side of the fin has the shape, from which a part of the similar figure of the first airfoil shape larger in size than the first airfoil shape at the first position on the top portion side is missing, in the trailing edge region, while basically having the shape of the similar figure, it is possible to mount the relatively large fin on the platform. Further, since the fin has at the first position on the top portion side the first airfoil shape with a shape, from which the trailing edge portion is not missing, relative to the second airfoil shape, the chord length of the fin is easily secured in the region on the top portion side of the fin where the contribution to the aerodynamic performance is large. Thus, it is possible to relatively reduce the size of the platform, while maintaining the aerodynamic performance of the vortex generator.

(3) In some embodiments, in the above configuration (1) or (2), in the fin, a first blade thickness ratio at a first position in the height direction is less than a second blade thickness ratio at a second position where the distance from the bottom surface of the platform is smaller than at the first position in the height direction.

With the above configuration (3), the first blade thickness ratio at the first position in the height direction is less than the second blade thickness ratio at the second position where the distance from the bottom surface of the platform is smaller than at the first position in the height direction. That is, since the fin has the shape, in which the chord length relative to the maximum blade thickness is relatively short, at the second position on the base portion side, the relatively large fin can be mounted on the platform. Further, since the fin has the shape, in which the chord length relative to the maximum blade thickness is relatively long, at the first position on the top portion side, the aerodynamic performance of the vortex generator is maintained easily. Thus, it is possible to relatively reduce the size of the platform, while maintaining the aerodynamic performance of the vortex generator.

(4) In some embodiments, in the above configurations (1) to (3), a width of the rear end surface of the fin decreases as the distance from the bottom surface of the platform increases in the height direction.

In the above configuration (4), the width of the rear end surface of the fin decreases as the distance from the bottom surface of the platform increases in the height direction.

Thus, since the width of the rear end surface is relatively large in the base portion of the fin where the contribution to the aerodynamic performance is relatively small, it is possible to mount the relatively large fin on the platform. Further, since the width of the rear end surface in the base portion of the fin is secured, the fin is supported easily. Furthermore, since the width of the rear end surface is relatively narrow in the top portion of the fin where the contribution to the aerodynamic performance is large, the chord length of the fin in the top portion is secured easily. Thus, it is possible to relatively reduce the size of the platform, while maintaining the aerodynamic performance of the vortex generator.

(5) In some embodiments, in the above configurations (1) to (4), a rear end portion (14') of the fin projects outward from an outer edge (11c) of the platform, as viewed from the height direction.

With the above configuration (5), since the rear end portion of the fin projects outward from the outer edge of the platform, the chord length of the fin in the top portion is secured easily. Thus, it is possible to easily reduce the size of the platform, while maintaining the aerodynamic performance of the vortex generator.

(6) In some embodiments, in the above configurations (1) to (5), an inclination angle ($\alpha$) of the rear end surface with respect to the bottom surface of the platform is not less than 55 degrees and not greater than 65 degrees, in a cross section including a chord of the fin and the height direction.

With the above configuration (6), since the inclination angle of the rear end surface with respect to the bottom surface of the platform is not greater than 65 degrees, in the cross section including the chord of the fin and the height direction, the trailing edge portion of the fin has the shape inclined backward. Therefore, the position of the trailing edge in the top portion of the fin can be shifted backward by a relatively large amount with respect to the position of the trailing edge in the base portion of the fin. Thus, it becomes easy to secure a sufficient chord length of the fin in the top portion. Further, since the above-described inclination angle is not less than 55 degrees, the trailing edge portion of the fin has a shape which is not excessively inclined backward. Therefore, it is possible to obtain the vortex generator provided with the fin having an appropriate size, while inclining the trailing edge portion of the fin. Thus, it is possible to relatively reduce the size of the platform, while maintaining the aerodynamic performance of the vortex generator.

(7) In some embodiments, in the above configurations (1) to (6), the leading edge of the fin is inclined backward as the distance from the bottom surface of the platform increases in the height direction of the fin, in at least a part of a region in the height direction, and an inclination angle of the rear end surface with respect to the bottom surface of the platform is greater than an inclination angle ($\beta$) of the leading edge with respect to the bottom surface of the platform, in a cross section including a chord of the fin and the height direction.

With the above configuration (7), the leading edge of the fin is inclined backward as the distance from the bottom surface of the platform increases in the height direction of the fin, in the at least a part of the region in the height direction, and the inclination angle of the rear end surface with respect to the bottom surface of the platform is greater than the inclination angle of the leading edge with respect to the bottom surface of the platform, in the cross section including the chord of the fin and the height direction. Therefore, the cross-sectional area of the fin in the top portion is easily reduced, thereby easily improving the aerodynamic performance. Thus, it is possible to relatively reduce the size of the platform, while maintaining the aerodynamic performance of the vortex generator.

(8) In some embodiments, in the above configurations (1) to (7), the fin includes a leading edge portion (13') having a curved contour in a cross section orthogonal to the height direction of the fin, and has a shape symmetrical about a chord of the fin.

With the above configuration (8), since the fin includes the leading edge portion having the curved contour in the cross section orthogonal to the height direction of the fin, when the vortex generator is installed on the wind turbine blade, the resistance to the flow of air flowing into the vortex generator is reduced easily. Therefore, the aerodynamic performance of the vortex generator is improved. Further, since the fin has the shape symmetrical about the chord of the fin, the vortex generator is molded easily compared with the case where the fin has a shape asymmetrical about the chord.

(9) In some embodiments, in the above configurations (1) to (8), a blade thickness ratio of the fin is at least 10% and at most 20%.

With the above configuration (9), since the blade thickness ratio of the fin is at least 10% and at most 20%, the vortex generator tends to have good aerodynamic performance.

(10) In some embodiments, in the above configurations (1) to (9), the leading edge of the fin is inclined backward as the distance from the bottom surface of the platform increases in the height direction of the fin, in at least a part of a region in the height direction, and an inclination angle of the leading edge with respect to the bottom surface of the platform is not less than 10 degrees and not greater than 20 degrees, in a cross section including a chord of the fin and the height direction.

With the above configuration (10), since the inclination angle of the leading edge with respect to the bottom surface of the platform is not less than 10 degrees, in the cross section including the chord of the fin and the height direction, it is easy to obtain the fin having an appropriate size, while inclining the leading edge portion of the fin. Further, since the above-described inclination angle is not greater than 20 degrees, it is easy to ensure the aerodynamic performance of the vortex generator. Thus, with the above configuration (10), it is possible to relatively reduce the size of the platform, while maintaining the aerodynamic performance of the vortex generator.

(11) In some embodiments, in the above configuration (10), the leading edge of the fin is inclined backward to a maximum height position of the fin as the distance from the bottom surface of the platform increases in the height direction.

With the above configuration (11), since the leading edge of the fin is inclined backward to the maximum height position of the fin as the distance from the bottom surface of the platform increases in the height direction of the fin, it is easy to ensure the aerodynamic performance of the vortex generator. Thus, it is possible to relatively reduce the size of the platform, while maintaining the aerodynamic performance of the vortex generator.

(12) In some embodiments, in the above configurations (1) to (11), the platform has a circular shape as viewed from the height direction of the fin.

With the above configuration (12), since the platform has the circular shape as viewed from the height direction of the fin, the platform is easily and stably adhered to the surface of the wind turbine blade. Thus, it is possible to suppress separation of the vortex generator from the wind turbine blade.

(13) In some embodiments, in the above configurations (1) to (12), the platform and the fin are formed of a resin.

With the above configuration (13), since the platform and the fin are made of the resin, the vortex generator is molded relatively easily.

(14) A wind turbine blade (1) according to at least one embodiment includes, in the above configurations (1) to (13): a blade body (2); and the vortex generator (10) according to any one of the above (1) to (13) attached to a surface of the blade body.

With the above configuration (14), the rear end surface of the at least one fin has the shape inclined backward as the distance from the bottom surface of the platform increases in the height direction of the fin. Therefore, by shifting the position of the trailing edge in the top portion of the fin, where contribution to aerodynamic performance of the wind turbine blade is large, backward with respect to the position of the trailing edge in the base portion of the fin where the contribution to the aerodynamic performance is relatively small, a sufficient chord length of the fin in the top portion is secured easily. Thus, the size of the platform can be made relatively small relative to the fin, while maintaining the aerodynamic performance of the vortex generator. Therefore, it is possible to obtain the vortex generator mounted with the larger fin while suppressing the increase in size of the platform.

(15) A wind power generating apparatus according to at least one embodiment includes, in the above configuration (14): a wind turbine rotor (42) including a wind turbine blade; and a generator configured to be driven by the wind turbine rotor.

With the above configuration (15), the rear end surface of the at least one fin has the shape inclined backward as the distance from the bottom surface of the platform increases in the height direction of the fin. Therefore, by shifting the position of the trailing edge in the top portion of the fin, where contribution to aerodynamic performance of the wind turbine blade is large, backward with respect to the position of the trailing edge in the base portion of the fin where the contribution to the aerodynamic performance is relatively small, a sufficient chord length of the fin in the top portion is secured easily. Thus, the size of the platform can be made relatively small relative to the fin, while maintaining the aerodynamic performance of the vortex generator. Therefore, it is possible to obtain the vortex generator mounted with the larger fin while suppressing the increase in size of the platform.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Wind turbine blade
2 Blade body
3 Blade root
4 Blade tip
5 Airfoil portion
6 Leading edge
7 Trailing edge
8 Pressure surface
9 Suction surface
10 Vortex generator
11 Platform
11$a$ Upper surface
11$b$ Bottom surface
11$c$ Outer edge
12, 12A, 12B Fin
13 Leading edge
13' Leading edge portion
13$a$ Leading edge
13$b$ Leading edge
14 Trailing edge
14' Rear end portion
14$a$ Trailing edge
14$b$ Trailing edge
16 Suction surface
17 Base portion
18 Top portion
19 Rear end surface
40 Wind power generating apparatus
42 Rotor
43 Hub
44 Nacelle
46 Tower
48 Base structure
102 Leading edge region
104 Trailing edge region
$CP_1$ First airfoil shape
$CP_2$ Second airfoil shape
P1 First position
P2 Second position

The invention claimed is:

1. A vortex generator for wind turbine blade, comprising:
a platform; and
least one fin disposed projecting from an upper surface of the platform, and including a leading edge and a trailing edge,
wherein a rear end surface of the at least one fin, including the trailing edge, has a shape inclined backward as a distance from a bottom surface of the platform increases in a height direction of the fin, and
wherein the fin has a first airfoil shape at a first position in the height direction, and a second airfoil shape at a second position where the distance from the bottom surface of the platform is smaller than at the first position in the height direction, the second airfoil shape including a leading edge region which coincides with a figure of the first airfoil shape having a same shape as the first airfoil shape and a larger size than the first airfoil shape, and a trailing edge region with a shape of the figure a part of which is missing.

2. A vortex generator for wind turbine blade, comprising:
a platform; and
least one fin disposed projecting from an upper surface of the platform, and including a leading edge and a trailing edge,
wherein a rear end surface of the at least one fin, including the trailing edge, has a shape inclined backward as a distance from a bottom surface of the platform increases in a height direction of the fin, and
wherein, in the fin, a first blade thickness ratio, which is a ratio of a maximum blade thickness to a chord length at a first position in the height direction, is less than a second blade thickness ratio, which is a ratio of a maximum blade thickness to a chord length at a second position where the distance from the bottom surface of the platform is smaller than at the first position in the height direction.

3. A vortex generator for wind turbine blade, comprising:
a platform; and
least one fin disposed projecting from an upper surface of the platform, and including a leading edge and a trailing edge,
wherein a rear end surface of the at least one fin, including the trailing edge, has a shape inclined backward as a distance from a bottom surface of the platform increases in a height direction of the fin, and
wherein a width of the rear end surface of the fin decreases as the distance from the bottom surface of the platform increases in the height direction.

4. The vortex generator for wind turbine blade according to claim 1,
wherein a rear end portion of the fin projects outward from an outer edge of the platform, as viewed from the height direction.

5. The vortex generator for wind turbine blade according to claim 1,
wherein an inclination angle of the rear end surface with respect to the bottom surface of the platform is not less than 55 degrees and not greater than 65 degrees, in a cross section including a chord of the fin and the height direction.

6. The vortex generator for wind turbine blade according to claim 1,
wherein the leading edge of the fin is inclined backward as the distance from the bottom surface of the platform increases in the height direction of the fin, in at least a part of a region in the height direction, and
wherein an inclination angle of the rear end surface with respect to the bottom surface of the platform is greater than an inclination angle of the leading edge with respect to the bottom surface of the platform, in a cross section including a chord of the fin and the height direction.

7. The vortex generator for wind turbine blade according to claim 1,
wherein the fin includes a leading edge portion having a curved contour in a cross section orthogonal to the height direction of the fin, and has a shape symmetrical about a chord of the fin.

8. The vortex generator for wind turbine blade according to claim 1,
wherein a blade thickness ratio of the fin, which is a ratio of a maximum blade thickness to a chord length at a position in the height direction, is at least 10% and at most 20%.

9. The vortex generator for wind turbine blade according to claim 1,
wherein the leading edge of the fin is inclined backward as the distance from the bottom surface of the platform increases in the height direction of the fin, in at least a part of a region in the height direction, and
wherein an inclination angle of the leading edge with respect to the bottom surface of the platform is not less than 10 degrees and not greater than 20 degrees, in a cross section including a chord of the fin and the height direction.

10. The vortex generator for wind turbine blade according to claim 9,
wherein the leading edge of the fin is inclined backward to a maximum height position of the fin as the distance from the bottom surface of the platform increases in the height direction.

11. The vortex generator for wind turbine blade according to claim 1,
wherein the platform has a circular shape as viewed from the height direction of the fin.

12. The vortex generator for wind turbine blade according to claim 1,
wherein the platform and the fin are formed of a resin.

13. A wind turbine blade, comprising:
a blade body; and
the vortex generator according to claim 1 attached to a surface of the blade body.

14. A wind power generating apparatus, comprising:
a wind turbine rotor including the wind turbine blade according to claim 13; and
a generator configured to be driven by the wind turbine rotor.

15. A wind turbine blade comprising:
a blade body, and
the vortex generator according to claim 2 attached to a surface of the blade body.

16. A wind turbine blade comprising:
a blade body, and
the vortex generator according to claim 3 attached to a surface of the blade body.

17. A wind power generating apparatus, comprising
a wind turbine rotor including the wind turbine blade according to claim 15, and
a generator configured to be driven by the wind turbine rotor.

18. A wind power generating apparatus, comprising
a wind turbine rotor including the wind turbine blade according to claim 16, and
a generator configured to be driven by the wind turbine rotor.

* * * * *